April 13, 1954      J. LA RUSSA      2,674,807
EDGE FINDING TOOL
Filed Oct. 1, 1952
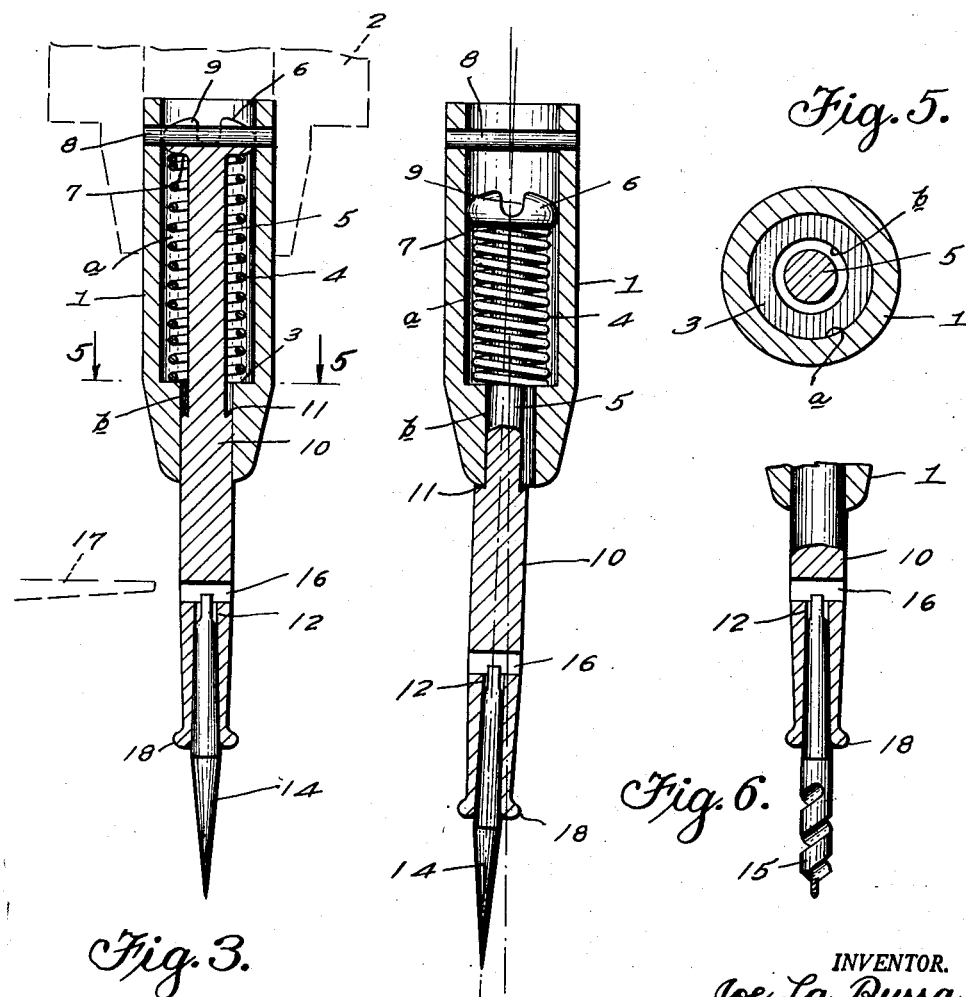

Patented Apr. 13, 1954

2,674,807

UNITED STATES PATENT OFFICE 2,674,807

EDGE FINDING TOOL

Joe La Russa, Pasadena, Calif.

Application October 1, 1952, Serial No. 312,621

4 Claims. (Cl. 33—169)

This invention relates to an edge finding tool for use with milling machines or any vertical drill with calibrated cables and has relation more particularly to a tool known among the trade as a "Wobble."

A wobble in general is an eccentric device that is placed in a chuck of a machine and the work is moved until an eccentric shaft comprised in the wobble strikes the edge of the work. The work is then slowly moved into the wobble and the eccentric shaft moves and becomes concentric with the edge of the work. When the wobble is concentric with the drill, the precise edge is known and by turning the vernier controls of the machine the drill may be moved to the exact spot desired on the work.

It is also an object of the invention to provide an edge finding tool including a hollow shank in which is partially inserted an indicating spindle together with means for constantly urging the spindle inwardly of the shank and wherein the spindle is provided with means under control of the spring for releasably maintaining the spindle when moved outwardly with respect to the shank into a position wherein the longitudinal axis of the spindle is angular to the axis of the shank.

The invention consists in the details of construction and in the combination and arrangement of the several parts of my improved edge finding tool, whereby certain advantages are attained, as will be hereinafter more fully set forth.

In order that my invention may be better understood, I will now proceed to describe the same with reference to the accompanying drawings, wherein:

Figure 1 is a diagrammatic view illustrating an initial step in the use of the edge finding tool or wobble as herein embodied;

Figure 2 is a view similar to Figure 1, showing a further step in the use of the tool.

Figure 3 is a view taken longitudinally through an edge finding tool or wobble constructed in accordance with an embodiment of the invention with parts in elevation, an associated chuck being shown in fragment by broken lines;

Figure 4 is a longitudinal sectional view taken through the tool as herein embodied with the indicating spindle in an extended working adjustment;

Figure 5 is a sectional view taken substantially on the line 5—5 of Figure 3, looking in the direction of the arrows, and Figure 6 is a fragmentary elevational view illustrating a slightly modified form of the invention.

In the embodiments of the invention illustrated in the accompanying drawings, 1 denotes a hollow shank to be held by the chuck 2 of a milling machine or the like. The outer end portion of the bore $a$ of the shank 1 is reduced in diameter, as at $b$, providing an inwardly facing shoulder 3, against which bears an end of a coil spring 4 of requisite tension under compression. This spring 4 encircles the inner end portion of an indicator spindle 5 which is freely disposed into the hollow shank 1 through the portion $b$ of the bore $a$.

The inserted extremity of the spindle 5 has rigid therewith an enlargement or head 6 providing an outwardly facing shoulder 7 against which bears the adjacent end of the spring 4. In the assembled tool, the spindle 5 is constantly urged inwardly by the spring 4 and the extent of such inward movement is limited by contact of the head or enlargement 6 of the spindle 5 with the stop pin 8 carried by the shank 1 and intersecting the bore $a$ of the shank 1 at a point in close proximity to the end of the shank 1 remote from the restricted bore $b$. The outer face of the head 6 has disposed thereacross the angularly related grooves 9 providing seats to accommodate the stop pin 8 when the spindle 5 is at its innermost position with the shank 1.

The outer portion 10 of the spindle 5 is of increased diameter and the inner extremity of such portion 10 of the spindle 5 is snugly received within the portion $b$ of the bore $a$ when the spindle 5 is in its retracted position as effected by the spring 4.

As is clearly shown in the drawings, the inner portion of the spindle 5 is of a diameter materially less than the diameter $b$ of the bore $a$ of the shank 1 so that upon requisite withdrawal or outward endwise movement of the spindle 5, the head 6 may assume a position angular to the axial center of the portion $b$ of the bore $b$.

The outer portion 10 of the spindle 5 provides at its inner end a shoulder 11 surrounding the adjacent inner end of the reduced inner portion of the spindle 5 which, upon requisite outward or withdrawal movement of the spindle 5 is, upon side swinging of the head 6, held by the spring 4 in contact with the adjacent or outer end of the shank 1, as shown in Figure 4 of the drawings.

The outer extremity of the portion 10 of the spindle 6 is provided with an axial bore 12 of standard taper and open at its outer end. This bore 12 provides a socket for a pointing tool 14, as shown in Figures 4 and 5 or a small drill 15 as illustrated in Figure 6. The inner end portion of the bore or socket 12 is intersected by a hole 16 drilled transversely through the spindle so that a key 17 shown by dotted lines in Figure 3, may be inserted in the hole 12 to assist in the removal of the pointer 14 or drill 15. The pointing tool 14 and the drill 15 are merely accessories and do not aid in determining the edge.

In practice, the operator first pulls out the spindle 5 until the shoulder 11 can be engaged with the adjacent end of the shank 1. This contact is maintained by the spring 4 and during which time the spindle 5 is at an angle to the axis of the portion b of the bore a of the shank 1 resulting in the outer end of the spindle 5 being eccentric to the axial center of said portion b of the bore a of the shank 1, as illustrated in Figure 4 of the drawings.

After the adjustment just described, the shank 1 is engaged in the usual way with the chuck of a milling machine or any vertical drill and the chuck lowered to bring the outer end of the shank 5 below the top plane of the work W. By the usual mechanism of the machine and while the shank 1 is in rotation, the work W is moved toward the shank 5 until the work is contacted by the shank 5. When the exact edge of the work W is achieved by the movement of the work, the pressure of the work against the extended shank will force the spindle 5 into axial alignment with the portion b of the bore a of the shank 1 whereupon the spring 4 will snap back or immediately retract the spindle 5. When the spindle 5 is snapped back or retracted, the precise edge is known to a minute thousandths of an inch. After this snap back or retraction of the spindle 5, the work W is further moved a distance equal to one half the diameter of the shank 1, as indicated at x in Figure 2, whereupon the drill is immediately over a precise edge of the work. When desired, by proper manipulation the chuck 2 may be lowered to cause either the tool 14 or the drill 15 to mark the work W. The chuck 2 is then raised and the edge finding tool or "Wobble" as a unit is removed and the drill of desired size inserted into the chuck.

In use, the work is contacted by the surrounding lip 18 carried by the outer extremity of the portion 10 of the spindle 5. The periphery of the lip 18 is concentric to the axis of the spindle 5 so that when the spindle snaps back into retracted position as shown in Figure 3, it will be known the edge is the radius or one half the major diameter of the lip 18. Therefore, the spindle 5 carries a lip 18 in accordance with the edge to be determined.

From the foregoing description it is thought to be obvious that an edge finding tool constructed in accordance with my invention is particularly well adapted for use by reason of the convenience and facility with which it may be assembled and operated.

I claim:

1. An edge finding tool comprising a hollow shank for engagement with the chuck of a milling machine or the like, the outer end of the bore of the shank being open, an indicating spindle freely extending within the shank through the open end of the bore, means for constantly urging the spindle inwardly of the shank, said spindle at all times extending outwardly beyond the shank, said shank and spindle having coacting means for holding the spindle against transverse movement independently of the shank when the spindle is in normal retracted position but permitting independent angular adjustment of the spindle with respect to the axis of the shank when the spindle is withdrawn a predetermined distance, and releasable means for holding the withdrawn spindle against return movement when the withdrawn spindle is in an angularly adjusted position.

2. An edge finding tool as set forth in claim 1, wherein the means for holding the spindle in withdrawn position comprises a shoulder on the spindle for contact with the adjacent end of the shank.

3. An edge finding tool as set forth in claim 1, wherein the bore portion of the shank adjacent to the open end of the bore is reduced in diameter, the inner portion of the spindle being of a diameter less than the diameter of the reduced portion of the bore to permit angular adjustment of the spindle after the predetermined withdrawal of the spindle, the outer portion of the spindle being of a diameter to snugly engage within said reduced portion of the bore when the spindle is retracted to prevent angular adjustment of the spindle.

4. An edge finding tool comprising a shank for engagement with the chuck of a drill press, an elongate indicating spindle carried by the spindle and extending at all times therebeyond, said spindle being adjustable into either an extended position or a retracted position with respect to the shank, said spindle when extended being also angularly adjustable with respect to the axes of the shank, means for holding the angularly adjusted spindle against inward movement, said means becoming inoperative upon lateral pressure on the spindle, and means for retracting the spindle immediately upon release of the spindle from angular position.

References Cited in the file of this patent

UNITED STATES PATENTS

| Number | Name | Date |
|---|---|---|
| 2,053,776 | McGill | Sept. 8, 1936 |
| 2,090,178 | Buckner | Aug. 17, 1937 |
| 2,220,923 | Trilling | Nov. 12, 1940 |